Patented Mar. 1, 1949

2,463,032

UNITED STATES PATENT OFFICE 2,463,032

UREA- OR MELAMINE-FORMALDEHYDE RESIN PLASTICIZED WITH POLYACRYLONITRILE

Norman D. Hanson, Bloomfield, N. J., assignor to Bakelite Corporation, a corporation of New Jersey No Drawing. Application January 30, 1945, Serial No. 575,366

5 Claims. (Cl. 260—45.2)

This invention relates to plasticizers for brittle resins, such as urea-aldehyde, melamine-aldehyde and similar resins that harden upon heating. Agents for plasticizing resins must remain compatible with the resins under all conditions, and they should be normally solid and substantially free from volatile components for non-interference with uses made of the resins; it is to this type of plasticizers that the invention is particularly directed.

Resins like the reaction products of urea or melamine with formaldehyde set up rapidly under the action of heat to infusible resins that are free from color, and accordingly they are desirable in surface sheets for laminates. But they craze or shrink, particularly when films of these resins exceed 0.0005 inch in thickness, and changes in humidity as well as thermal shocks hasten the checking of the surfaces; the literature indicates the crazing of urea-formaldehyde resins to be due to a continuance of the condensation process (Ellis, "The Chemistry of Synthetic Resins," pages 564, 588, 630), and melamine-formaldehyde resins behave in a similar manner. The degree of surface checking also depends in part upon the core material to which the surfacing is applied; cores of asbestos board, "Tempered Masonite," plywood, and the like promote checking because they do not shrink as much as the resin surfacing during the molding of the laminates, and when the cores are subjected to alternate cycles of high and low humidity, the resin surfaces expand and contract while the cores remain dimensionally stable.

According to the present invention the tendency upon heat-hardening to crazing or checking of films or surfacings of urea, melamine and similar resins, can be entirely eliminated, thus making the resins suitable for extended wall surfacings in addition to table tops and trays. It is dependent upon the discovery that polyacrylonitrile is dispersible with and acts as a plasticizer for resins of this type. The acrylonitrile polymer, while normally solid, becomes tougher at elevated temperature; it is possible that it yields and absorbs the stresses developed in the resin with changes in temperature.

The proportion of acrylonitrile polymer necessary for complete elimination of crazing varies, but about 35 to 40 parts by weight to each 100 parts of the resin is ample for the purpose; as little as 10 per cent, however, is effective, and the proportion may run as high as 75 per cent without undue interference with the hot-molding of laminates and other articles or their properties.

To demonstrate, a heat-hardenable melamine resin was made by reacting 1 mol of melamine with 2.35 mols of formaldehyde in the presence of an alkaline catalyst; the usual practice was followed in its manufacture, and the resin-forming procedure forms no part of the present invention. Two pigmented resin mixes or enamels were made as follows, the parts being by weight:

| Ingredients | A | B |
|---|---|---|
| | Parts | Parts |
| Melamine resin | 100 | 100 |
| Dissolved in water | 80 | 80 |
| And ethyl alcohol | 20 | 20 |
| Zinc sulfide pigment | 60 | 60 |
| Alcohol-water thinner | 20 | 35 |
| Polyacrylonitrile | 0 | 40 |

The acrylonitrile polymer, which was solid at room temperature, was obtained by refluxing for about 2 hours 100 parts of the monomer in 100 parts of water to which 8 parts of ethyl alcohol had been added; 0.25 per cent (based on the total composition) of lauroyl peroxide was included as a catalyst. The mixtures were ground separately in pebble mills for 48 hours. After grinding, the mixtures were used for the preparation of surface sheets by coating 7 mil rag (or alpha cellulose) paper; the thickness of the dried coated paper was about 12 mils.

Panels were made by molding assemblies of paper core stock, having a 40 per cent heat-reactive phenol-formaldehyde content by weight, and surface sheets of each of the dried enamel-coated papers for 30 minutes at 300° F. with 1000 p. s. i. pressure; the panels were then discharged hot from the press, i. e. without cooling the platens. A panel having a surface sheet of the A enamel was badly checked when removed from the press; but a panel made with the B enamel surfacing did not check, nor could it be made to check by immersing the panel in boiling water for 60 minutes and then plunging into ice water, and sections of the B panel heated in an oven at 150° C. for 60 minutes and chilled in ice water did not check.

The A and B enamel-treated sheets were also molded as surface sheets on plywood cores, with sheets of paper treated with a phenolformaldehyde resin interposed between the surface sheets and the plywood cores, at 200 p. s. i. for 10 minutes at 300° F.; the panels were discharged hot from the press. The A-surfaced panel was severely checked while the surface of the B panel was free from checks and craze.

As another illustration, equal parts by weight of the same polyacrylonitrile and the same melamine-formaldehyde resin were mixed on hot compounding rolls; the cooled, sheeted material was ground to pass a 60 mesh screen. Test cups were molded for 2 minutes at 320° F. and 3000 p. s. i., and the molded cups were discharged hot. The cups possessed a glossy surface finish and were sufficiently rigid to retain their original shape; the hot cups could be flexed with pressure of the fingers. Bottle caps molded from the ground material had sufficient pliability at the molding temperature to permit stripping from the molds without deformation or injury to the threads.

The same elimination of crazing or checking was noted in laminates and molded articles made from urea-formaldehyde resins having the acrylonitrile polymer incorporated therein.

What is claimed is:

1. Composition comprising a resinous aldehyde condensation product of a member of the group consisting of urea and melamine characterized in film-form by a tendency to crazing upon hardening by heat, and a plasticizer therefor consisting of about 10 to 75 parts by weight of normally solid homopolymerized acrylonitrile to each 100 parts of the resinous product.

2. Composition comprising a resinous melamine-formaldehyde condensation product characterized in film-form by a tendency to crazing upon hardening by heat, and a plasticizer therefor consisting of about 10 to 75 parts by weight of normally solid homopolymerized acrylonitrile to each 100 parts of the resinous product.

3. Composition comprising a resinous melamine-formaldehyde condensation product characterized in film-form by a tendency to crazing upon hardening by heat and a plasticizer therefor consisting of about 35 to 40 parts by weight of normally solid homopolymerized acrylonitrile to each 100 parts of the resinous product.

4. Article comprising a base having a surfacing of a composition comprising a resinous aldehyde condensation product of a member of the group consisting of urea and melamine characterized in film-form by a tendency to crazing upon hardening by heat and a plasticizer therefor consisting of about 10 to 75 parts by weight of normally solid homopolymerized acrylonitrile to each 100 parts of the resinous product.

5. Article comprising a base having a surfacing of a composition comprising a resinous melamine-formaldehyde condensation product characterized in film-form by a tendency to crazing upon hardening by heat and a plasticizer therefor consisting of about 10 to 75 parts by weight of normally solid homopolymerized acrylonitrile to each 100 parts of the resinous product.

NORMAN D. HANSON.

REFERENCES CITED

The following references are of record in the file of this patent:

UNITED STATES PATENTS

| Number | Name | Date |
| --- | --- | --- |
| 2,187,833 | Ludwig | Jan. 16, 1940 |
| 2,191,581 | Nowak | Feb. 27, 1940 |
| 2,232,785 | Howk | Feb. 25, 1941 |
| 2,336,792 | Langkammerer | Dec. 14, 1943 |

FOREIGN PATENTS

| Number | Country | Date |
| --- | --- | --- |
| 309,487 | Great Britain | 1930 |
| 555,148 | Great Britain | Aug. 6, 1943 |

OTHER REFERENCES

Powers: "Synthetic Resins and Rubbers," pages 80, 81, 89–93, pub., 1943, by John Wiley and Sons, N. Y.